Sept. 20, 1949.   L. H. HOSBEIN   2,482,618
LINING FOR VESSELS, ETC

Filed July 2, 1945   4 Sheets-Sheet 3

*INVENTOR.*
LOUIS H. HOSBEIN.

BY Zabel and Fitzhaugh
Attorneys

Sept. 20, 1949.　　　　L. H. HOSBEIN　　　　2,482,618
LINING FOR VESSELS, ETC
Filed July 2, 1945　　　　　　　　　　　　4 Sheets-Sheet 4
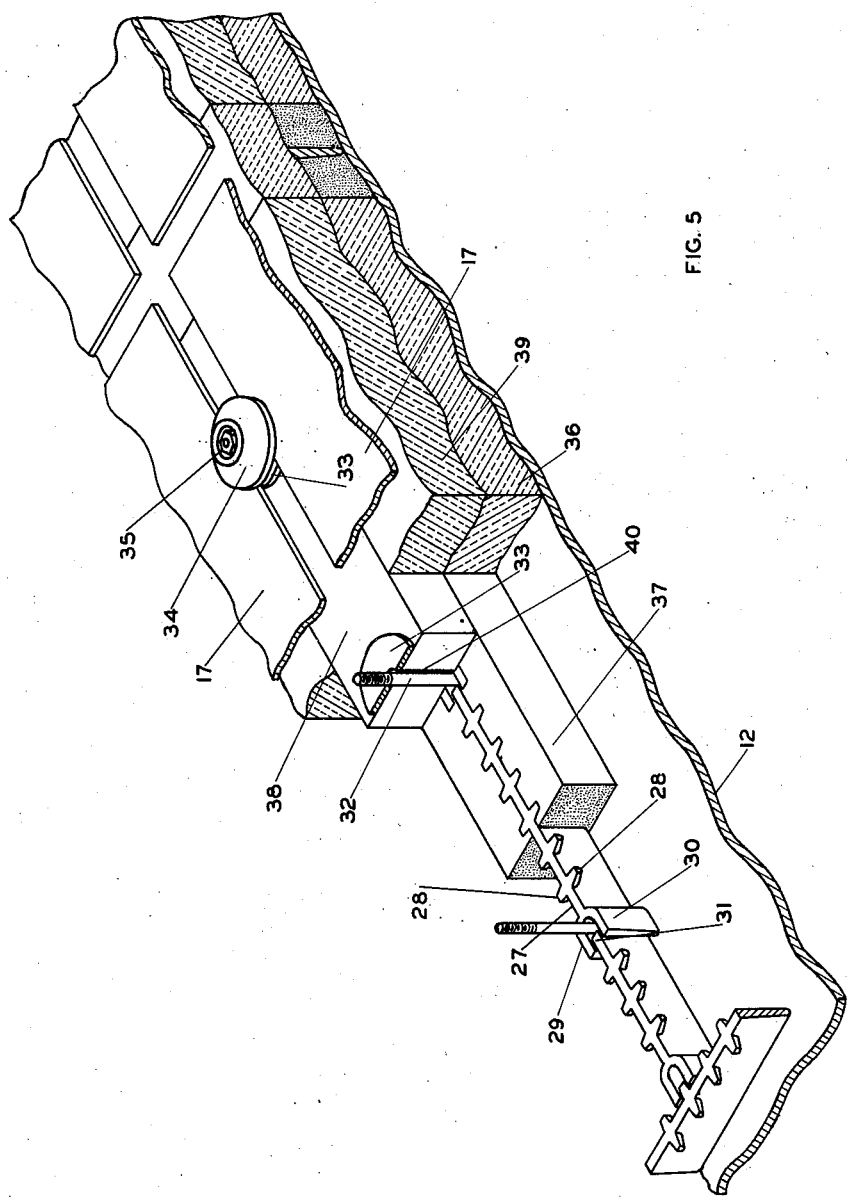
INVENTOR.
LOUIS H. HOSBEIN.
BY Patented Sept. 20, 1949

2,482,618

UNITED STATES PATENT OFFICE 2,482,618

LINING FOR VESSELS, ETC.

Louis H. Hosbein, Glencoe, Ill., assignor to M. H. Detrick Company, Chicago, Ill., a corporation of Delaware Application July 2, 1945, Serial No. 602,841

7 Claims. (Cl. 72—14)

The present invention is directed to means for protecting the bottom portion and walls of the vessel in a regenerator of a fluid catalyst system. In such vessels a fine carbon coated material is forced upwardly through a bottom inlet. This inlet may be connected to an elongated conduit such as that shown in my prior Patent 2,413,183. That application explains how the material cuts into the lining of the conduit and how the pressure within the conduit varies over a wide range.

The invention disclosed and claimed herein, although directed specifically to means for lining the cone shaped bottom part of the vessel, is not limited to such use. The construction is such that it may be utilized to line the floors or walls or any other part of a vessel or container and it may also be used as a lining for a conduit.

In the vessel to which my invention is shown as applied there is a cone shaped bottom portion above which it is customary to lock a grid or screen consisting of a sheet metal plate with a multiplicity of openings therethrough. The function of the cone shaped portion is to direct fine granular or powdered material up through the openings in the grid with a decreasing velocity so that the granular material in the vessel may be held more or less stationary, suspended in air. The pressure at the point where the pipe enters the vessel generally is in the neighborhood of three pounds per square inch. However, this pipe or conduit often may have a pressure of fifteen pounds per square inch therein at its inlet end where the fine material is fed to it. The pressure at the top of the vessel is of course much less than that at the point where the pipe enters the vessel. Owing to the nature of the action that takes place in the vessel there is a great variation in the pressure in the lower part of the vessel and in the upper end of the pipe. The temperature inside the vessel may be as high as 1200° F. with an outside temperature in the neighborhood of 150° F. This makes it necessary that some insulation be provided for the steel shell of the vessel.

It is a purpose of this invention to provide a novel means whereby insulation may be applied with a protecting lining to the interior vessel and pipe walls. It has been found that it is particularly difficult to maintain insulation at the cone shaped bottom part of the vessel because of the wide variation in pressure conditions at this level. My invention contemplates means whereby the inner lining of the vessel is partitioned off into zones and is tied to the steel shell so that the insulation will not be torn out by the sudden changes of pressure and the lining can be held in place under all operating conditions.

The nature and advantages of my invention will appear more fully from the following description and the accompanying drawings wherein a preferred form of the invention is shown. It should be understood however that the drawings and description are illustrative only and should not be taken as limiting the invention except insofar as it is limited by the claims.

In the drawings:

Figure 5 is a fragmentary perspective view with the various parts broken away to illustrate the detailed construction of the lining embodying my invention.

Figure 1:
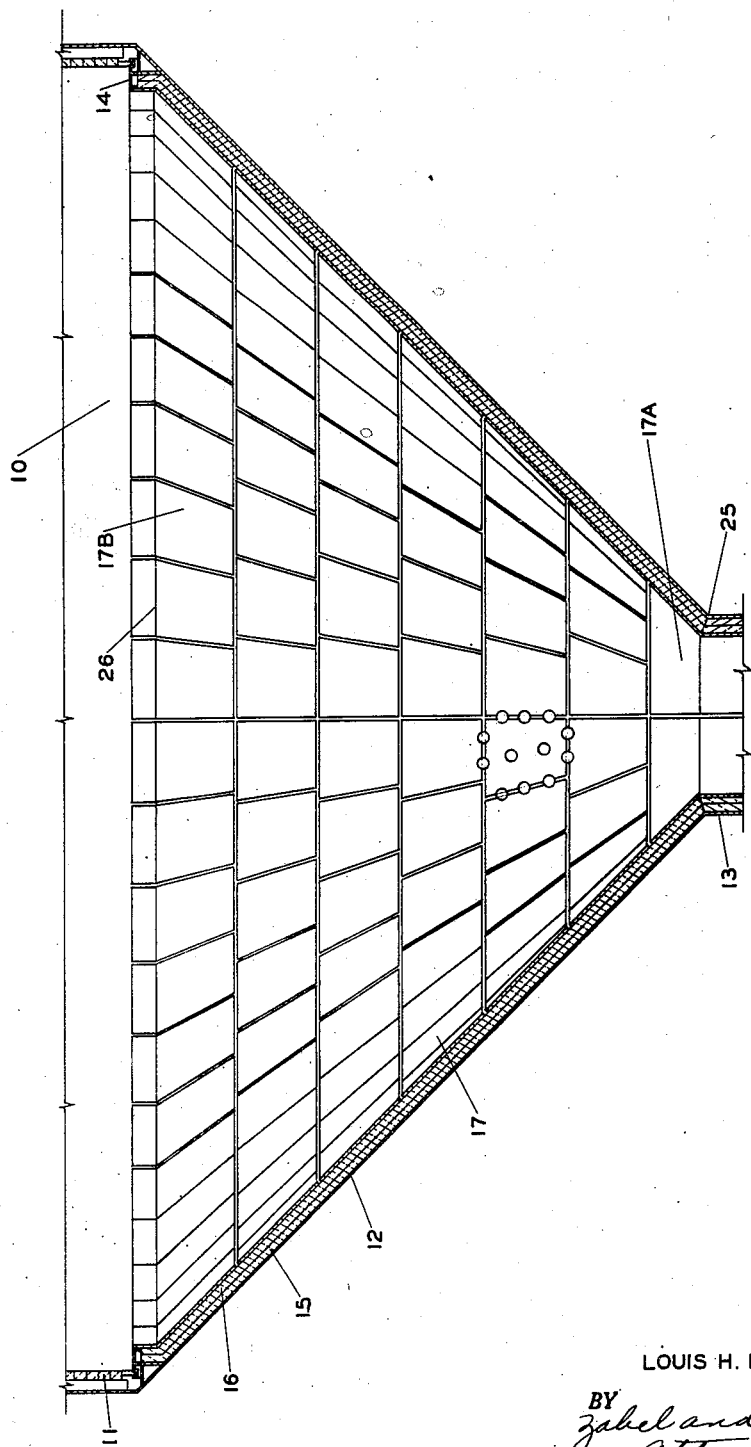
Figure 1 is a sectional view through the cone shaped bottom part of a vessel embodying my improved lining.

Referring now to the drawings the present invention is shown in connection with a regenerative still vessel 10 which is usually made of steel. The nature and use of this vessel has heretofore been referred to. In vessels of this character it is essential that the steel wall be protected by an inner lining 11. Even with such lining difficulty has been encountered in the cone shaped part 12 of the vessel and in the inlet pipe 13 of the vessel because of the tremendous variations in pressure that are encountered. The granular material which is passed up through the pipe portion 13 and expanded in the cone shaped portion 12 is usually passed through a grid or screen (not shown) that may be supported upon a shelf 14 formed at the top of the cone shaped portion of the vessel. At times the pressure variations between the inlet 13 and the screen is quite high. At other times it is quite low. The temperature varies a great deal too and thus makes it necessary for any lining that is applied to expand and contract. Therefore, it should be mounted so as to expand and contract. As mentioned, there is often a wide variation in pressure between the top and bottom edges of the cone shaped part of the vessel. The sudden changes in pressure in the vessel actually break loose linings of ordinary refractory material and insulation so that the subsequent changes in pressure tear the insulation out entirely in spots, thus allowing the steel shell to get too hot and destroying it. In its broadest aspect my invention comprises the supporting of insulation layers such as that shown at 15 and 16 in the drawings by providing a cover of metal plates 17 and anchoring such plates to the steel shell of the vessel. In its more specific aspects my invention includes a combination lining whereby the insulation is segregated in belts and blocks by partitions that are composed of units that will follow a curved surface or expand along a straight surface and actually prevent the pressure changes from developing long passages through the insulation by which the insulation could be torn out.

Figure 2:
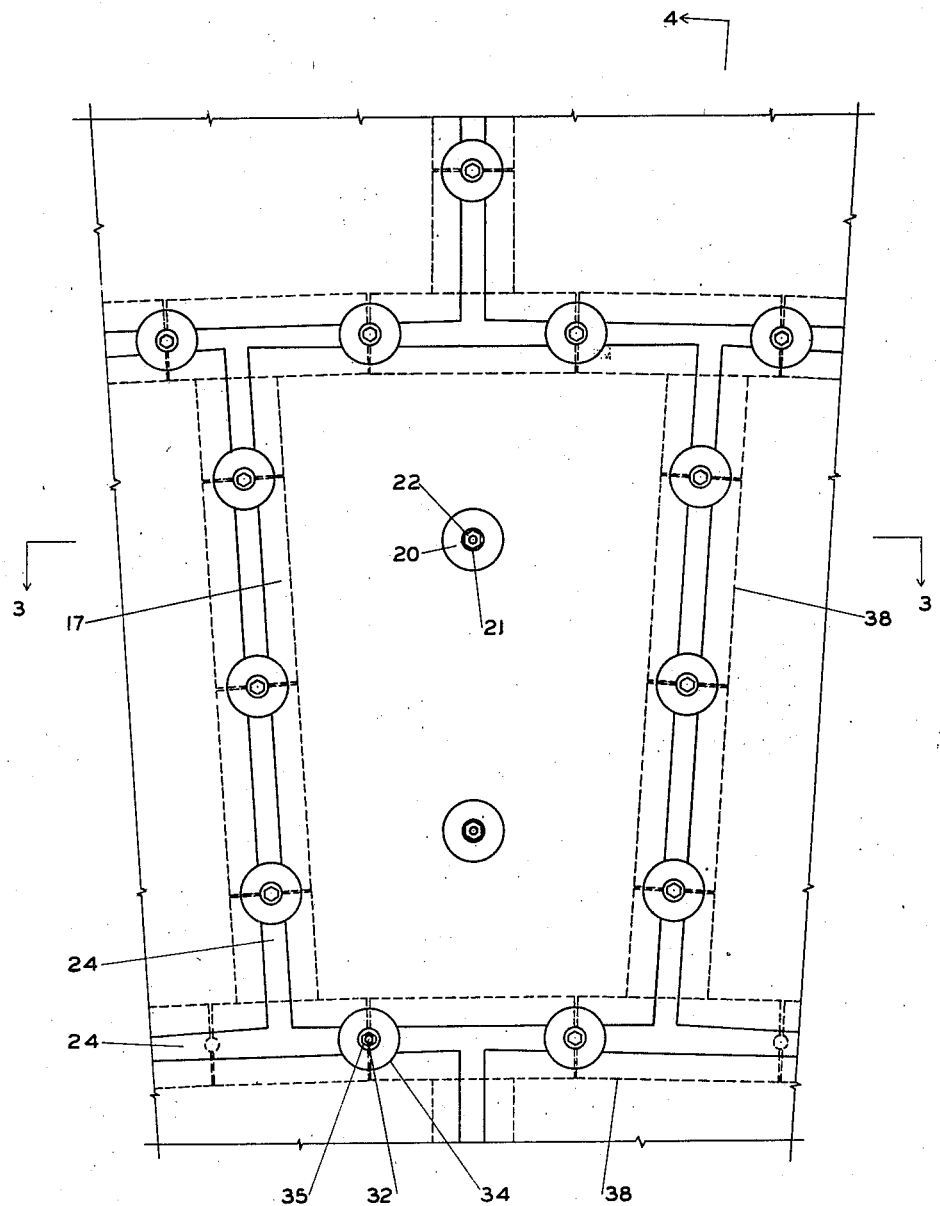
Figure 2 is an enlarged plan view of a portion of the bottom vessel wall to which my invention has been applied.
Figure 3:
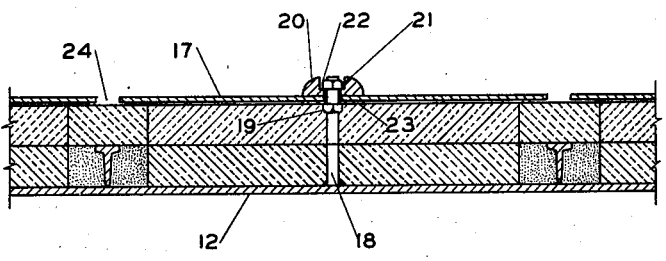
Figure 3 is a sectional view taken substantially on the line 3—3 of Figure 2.
Figure 4:
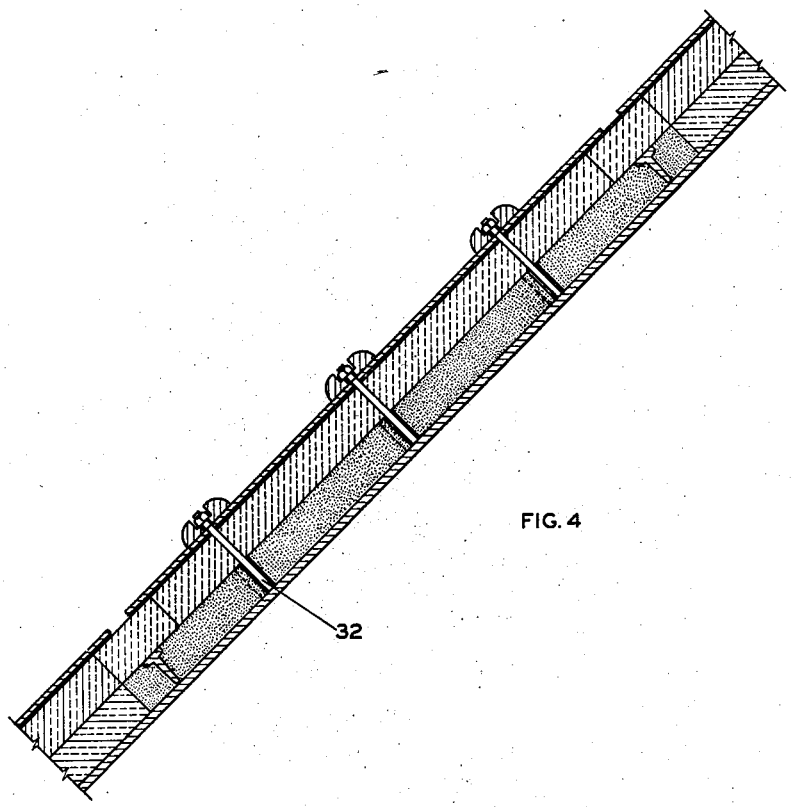
Figure 4 is a sectional view taken substantially on the line 4—4 of Figure 2.

Referring now to Figures 2 to 5 inclusive the manner in which the preferred construction is built up will be described. I start with the provision of a multiplicity of studs 18 which are welded to the steel shell 12 of the vessel and which project inwardly at spaced intervals from the cone shaped shell. These studs 18 are provided with stops 19 in the form of nuts threaded thereon and the plates 17 have spaced apertures therein through which the studs may extend. Small castings 20 are placed over the plates. These castings are recessed as indicated at 21 so that a nut 22 can be utilized to fasten them down. A washer 23 is also used beneath the plate 17 for mounting it on the studs.

The plates 17 are placed apart as indicated at 24 so as to provide for expansion and contraction. In the lining of the cone shaped bottom portion of the vessel the plates as shown are somewhat wedge shaped. However, the bottom plates 17a may extend down into the pipe portion 13 and be bent as shown at 25. Also the top plates 17b may be bent as shown at 26 to provide a vertical extending portion to meet the shelf 14.

Beneath the plates at along the linings where they meet I provide first a metallic partition which is composed of small castings 27 that have lugs 28 projecting from opposite sides thereof along the top edges thereof. These castings, hereinafter sometimes called "partition segments," are made in suitable lengths with provision for abutting one casting with the other and interlocking them. Each casting has one end provided with spaced jaws 29 and 30 to provide a channel or groove to receive the tip or tongue 31 of the next casting. The lugs 28 are very shallow in depth and extend only a slight distance below the top edge of a casting. Suitable studs 32 are welded to the shell 12 at spaced intervals along the junction lines of the plates 17. These studs 32 are similar to the studs 18 but need not be so sturdy, and they do not need the spacing nut 19. These studs project between the portions 29 and 30 of a casting and between the adjacent edges of two plates 17. Washers 33 and small castings 34, similar to the washer 23 and the castings 20 are utilized for securing the plates 17 to the studs 32. The studs are threaded to receive nuts 35 by which the plates can be drawn down against the insulating material and the refractory material beneath the plates.

The U-shape ends providing the grooves in the castings 27 are sufficiently long so that there is plenty of room for the stud 32 and the adjacent end or tongue 31 of another casting. In making an installation the castings or partition segments 27 are first placed on the shell 12 to divide the space of the shell into a multiplicity of sections. Sheets of insulation are then cut into blocks 36 of the right shape to fit within the space between the castings 27. These castings fit very well against a smooth surface because they are in relatively short lengths and because the curvature is on a large radius. Compared to the length of the castings they leave very little opening along the bottom of the casting for a blast of air to pass from one zone to another and carry the insulation with it. However, in order to make the insulation more air tight I utilize the lugs 28 as a means to aid in holding a plastic insulation material 37 in place. This plastic insulation material which is furnished under the name of Monoseal, Vapor-Seal can be tamped in place. It has a relatively high insulation value as compared to fire-brick, and when it is packed on opposite sides of the castings 27 it provides a substantial unbroken wall up to the level of the castings. I protect the casting from the heat within the furnace by providing refractory tile 38 directly beneath the facing edges of the plates 17. These tile 38 are of sufficient thickness to allow another layer of insulation 39 to be placed on top of the layer 36. After the tile 38 are laid in place the plates 17 can then be applied over the washers 33 and clamped in place by means of the castings 34 and the nuts 35. It will be noted from Figure 5 that the tile 38 have semi-circular grooves 40 in the ends thereof so that they can be readily positioned with respect to the studs 32. The inner linings 17 preferably are made of sheet steel and the castings 34 are preferably of cast iron.

This device has the advantage in that it is quite flexible as to the arrangement of the partitions in any vessel where the material of the vessel shell is to be protected against heat. The small studs such as 18 and 32, do not carry enough heat directly to the shell to damage the vessel. The small castings 27 being protected by the refractory tile 38 seldom reach a temperature that is more than half that of the surface of the plates 17. The contact between the castings 27 and the wall of the vessel is substantially a line contact and therefore, the heat transfer is poor. Also the plastic material 37 conducts some heat from the castings 27 so that the outer edges of these castings which are in contact with the vessel 12 are comparatively cool and do no damage to the vessel. The washers 33 perform an additional usable function in that they provide breathing space between the tile 38 and the plates 17 for air and gases that are trapped in the insulation. However, this space is very thin, and being well opened to the interior of the vessel, it does not aid the building up of pressure differentials such as to pull out the insulation.

From the foregoing description, it is believed that the nature and advantages of my invention will be clear to those skilled in the art.

Having thus described my invention, I claim:

1. In combination a wall subjected to variations in temperature and pressure over a substantial range, partitions dividing the wall area into zones, said partitions being relatively short segments with interlocking ends and being free to expand and contract with reference to said wall and to each other, heat insulating material covering the wall area between the partitions, refractory tile over the partitions, and plate means supported on the refractory tile and covering the zone areas bounded by the partitions, the heat insulating material substantially filling the space between the plate means and the wall, said plate means being held in substantially fixed relationship with respect to the wall.

2. An assembly comprising a wall subjected to variations in temperature and pressure over a substantial range, upstanding partitions on the wall dividing the wall area into adjacent rows of relatively small zones, said partitions being relatively short segments with interlocking ends and being free to expand and contract with reference to said wall and to each other, a plurality of plates substantially conforming in shape with the zone area bounded by the partitions and held in parallel, spaced relationship with respect to the wall and spaced from the partitions, refractory tile disposed over the partitions and corresponding in depth slightly less than the distance between the partitions and the plate disposed thereabove whereby a breathing space is provided between said tile and said plates, heat insulating material over the wall and substantially filling the zone areas between the partitions to a depth substantially corresponding to a distance between the wall and the plates, and means holding the center region of the plates in fixed position with respect to the wall.

3. A heat insulating lining for a wall subjected to variations in temperature and pressure over a substantial range, said lining comprising relatively short partition segments dividing the wall area into zones, said partition segments being free to expand and contract with reference to said wall and to each other, a plate in spaced, parallel relationship with respect to the wall and covering each zone, means fixing the central portion of each plate with respect to the wall, insulating material in each zone between the plate and the wall, and means yieldingly holding the edges of the plate in proper relationship with respect to the wall.

4. A heat insulating lining for a wall subjected to variations in temperature and pressure over a substantial range, said lining comprising partition segments partitioning the wall area into zones, said partition segments having means interlocking the segments together, said segments being free to expand and contract with respect to the wall and each other, heat insulating material in the zones bounded by the partition segments, plate means covering the insulating material, and means holding the center region of the plate means in fixed position relative to the wall.

5. A heat insulating lining for a wall subjected to variations in temperature and pressure over a substantial range, said lining comprising partition segments partitioning the wall area into zones, said partition segments having means interlocking the segments together, said segments being free to expand and contract with respect to the wall and each other, heat insulating material in the zones bounded by the partition segments, a plurality of plates covering the insulating material and being spaced apart to provide expansion spaces therebetween, means rigidly fastening the center of each plate with respect to the wall, and separate means yieldingly fastening the plate edges with respect to the wall.

6. A partition segment of the class described comprising an elongated upstanding web portion, laterally extending lugs secured to and spaced lengthwise of the web portion with their top surface substantially flushed with the top surface of the web, said lugs being spaced apart a distance greater than the lug width and having a height less than the height of the web portion, one end of the web having a groove therein and the other end having a tongue for fitting in the groove of an adjacent partition segment.

7. A heat insulating lining for a wall subjected to variations in temperature and pressure over a substantial range, said lining comprising partition segments partitioning the wall area into zones, said partition segments being free to expand and contract with reference to said wall and to each other, insulating material in the zones bounded by the partition segments, a metal plate substantially coextensive with each zone overlying the insulation material, and means holding each metal plate in fixed position relative to the wall.

LOUIS H. HOSBEIN.

REFERENCES CITED

The following references are of record in the file of this patent:

UNITED STATES PATENTS

| Number | Name | Date |
|---|---|---|
| 1,658,839 | Fahrenwald | Feb. 14, 1928 |
| 1,825,154 | McDermott | Sept. 29, 1931 |
| 2,020,630 | Anderson | Nov. 12, 1935 |
| 2,072,882 | Hogenson | Mar. 9, 1937 |
| 2,099,829 | Smith | Nov. 23, 1937 |
| 2,100,624 | Beckwith | Nov. 30, 1937 |